Aug. 22, 1967  TOSHIHIKO ISHIZUKA  3,337,234
STEERING ARRANGEMENT FOR FULL TRAILERS
Filed Feb. 16, 1965  2 Sheets-Sheet 1

INVENTOR.
Toshihiko ISHIZUKA
BY
ATTORNEYS

United States Patent Office 3,337,234
Patented Aug. 22, 1967

3,337,234
STEERING ARRANGEMENT FOR FULL TRAILERS
Toshihiko Ishizuka, Nishinomiya, Japan, assignor to Kawasaki Rolling Stock Mfg. Co., Ltd., Hyogo-ku, Kobe, Japan
Filed Feb. 16, 1965, Ser. No. 433,058
Claims priority, application Japan, Feb. 18, 1964, 39/8,399; Feb. 21, 1964, 39/9,075
5 Claims. (Cl. 280—99)

This invention relates to a trailer.

More particularly, this invention relates to a steering means in a full trailer having wheeled axletrees adjacent to the fore and aft end of the chassis thereof, whereby each trailer pulled by the tractor on an open road can be driven along the track of the preceding van without being drawn into or out of the curved path along which the tractor is proceeding.

It is very easy to conjecture that such trailers coupled to and pulled by a tractor can be driven on the open road much in the same manner as the railroad carriages or vans coupled to a locomotive are driven on the rails, if only the locus of movement delineated by the wheels of each of the pulled trailers on the ground should be brought into unison with that of the tractor, and in this case it is very probable that the transport capacity of road vehicles can be increased to a large extent and open road traffic remarkably facilitated.

This invention has been made with these points taken into consideration and aims at providing a full-type trailer equipped with a simplified steering mechanism whereby each trailer can be driven not only on a circular arc of a constant radius of curvature but also very accurately on a sinuous curve.

More particularly, an object of this invention is to provide a steering mechanism in a full-type trailer of which the front axle and rear axle are enabled to turn almost at the same time and in opposing directions through a suitable power transmission mechanism, wherein a rear axle of a pulled trailer is adjusted to turn at an angle equivalent to the steering angle of the front axle thereof, multiplied by a constant or ratio K more than null and less than unity plus steering angle of the front axle of a succeeding trailer, multiplied by a constant or ratio K' which is more than null and less than unity, and wherein said constant or ratio K added to said constant or ratio K' equals unity.

Another object of this invention is to provide a full-type trailer having such proportion of dimensions and having a front axle, rear axle and steering-coupling rod of such lengths and relative orientations that the spacing $l$ between the turning hubs of the front and rear axles of a trailer, added to the spacing $m$ between the turning hub of the rear axle and the coupling point of said trailer with the succeeding van, and the multiplied by said spacing $m$ either equals or substantially equals the length $S$ of steering-coupling rod multiplied by itself.

In the drawings illustrating an embodiment of this invention:

Figure 3:
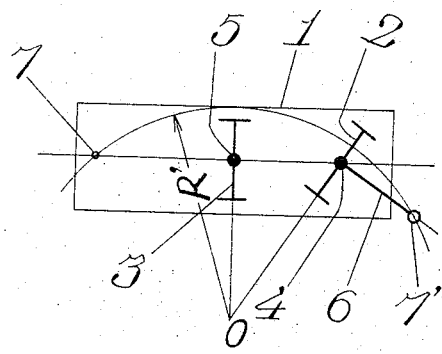
FIGS. 3, 4 and 5 are explanatory views illustrating the working principles of the full-type trailer steering mechanism according to the present invention.
Figure 4:
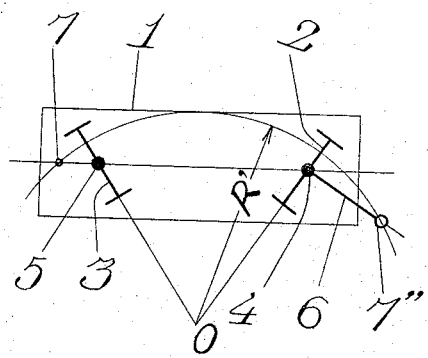

Before proceeding with the detailed description of an embodiment of this invention, it is best to refer to FIGS. 3 and 4 to more clearly described the working principle of this invention, in which a number of trailers coupled to a tractor and driven on a circular arc of a predetermined radius of curvature are taken as examples.

In this instance, a coupling pin 7", coupling a trailer having a chassis 1 to the trailer or tractor proceeding advance thereof, and the coupling pin 7, coupling said trailer to a following trailer, should be proceeding along the circumference of the same circle. If the rear axle 3 is fixed to the chassis 1 and cannot be steered, the hub 5 of the rear axle 3 has to be very much substantially spaced from said coupling pin 7 mounted on the rear, so that, from a practical point of view, it is apparently impossible to provide such a trailer.

Figure 1:
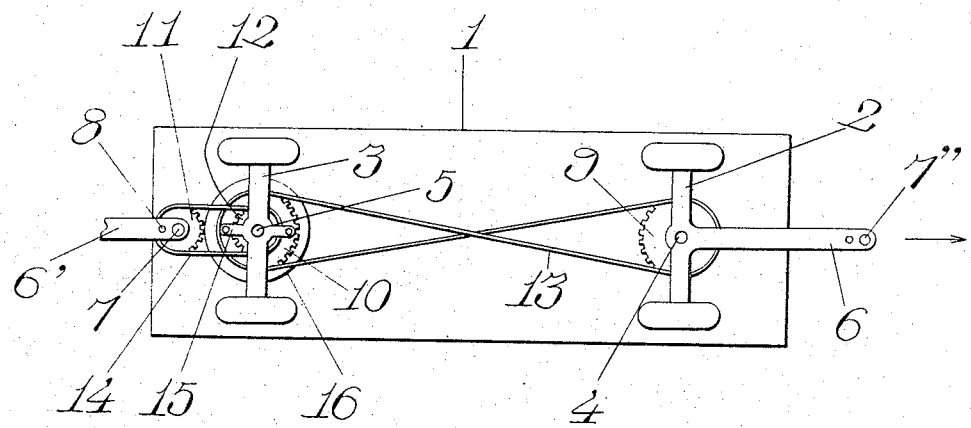
FIG. 1 is a bottom plan view of the full-type trailer according to the present invention.

Now, suppose the steering angles of the front axle 2 and rear axle 3 are adjusted to be equivalent and in opposing directions, by providing an endless chain 13 and mounting sprocket 10 on the rear axle 3 as in FIG. 1. In this instance, the distance between the hub or turning axis 5 of the rear axle 3 and the coupling pin 7 in the rear may be diminished considerably with relation to the length of radius R of a circular arc having a center O and constant radius of curvature on which said trailers are driven, as seen in FIG. 4, which brings about a degree of convenience. However, in case the curvature is freely changing, as for instance when a rectilinear or nearly rectilinear line on which said trailers are passing gradually merges into a curve of a smaller radius of curvature, the front axle 2 of a trailer is steered on the curved track, and simultaneously the rear axle 3 thereof is steered at an angle equivalent to the steering angle of said front axle 2 but contrary in direction, so that said rear axle 3 begins to turn while it ought to be following the rectilinear line, with the result that there arises a tendency for the rear portion of said trailer to be drawn out the circular arc on which said trailer is proceeding.

Supposing that various factors, such as gauges or dimensions are identical in the case of the coupled trailers, and that the steering angle of the rear axle 3 is adjusted to be equal to the steering angle of the front axle of the succeeding trailer, but contrary in direction, and that trailers are driven along a circular arc of a constant radius of curvature, the circumstances are identical as in FIG. 4, and the steering can be effected very smoothly. However, in case the curvature along which the trailers are passed is changing haphazardly as, for instance, when the rectilinear or substantially rectilinear line on which these trailers proceed merges gradually into a curve of a smaller radius of curvature, the rear axle 3 is not steered at the time that it ought to be a curve, so that there arises a tendency for the rear portion of a trailer to be drawn toward the inside of the circular arc on which said trailer is proceeding.

According to this invention, these two tendencies in the rear portion of a trailer, i.e. of being drawn into or out of the circular arc, are given simultaneously to the trailer so as to counteract each other, whereby the trailer may be enabled to follow the track of the preceding trailer accurately.

Figure 2:
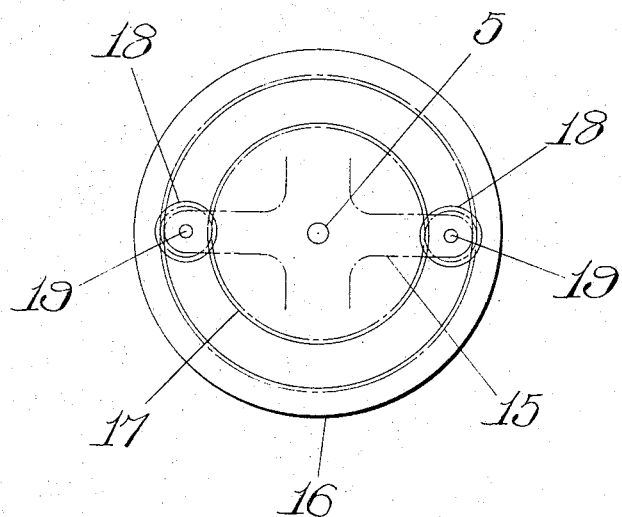
FIG. 2 is an enlarged view of a portion of FIG. 1.
Figure 5:
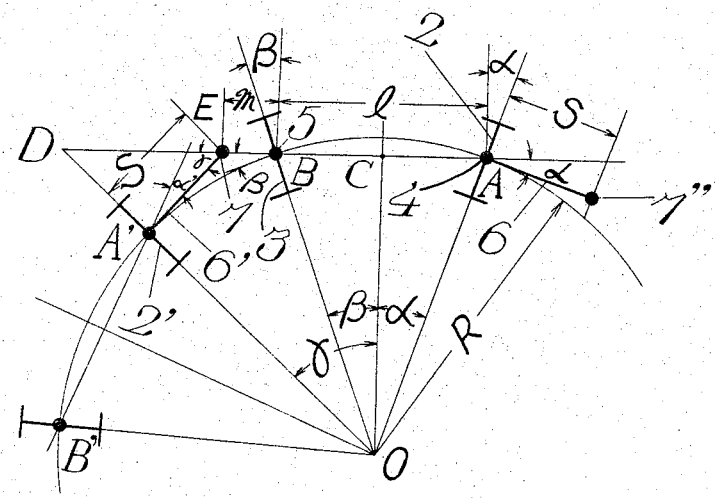

Describing an embodiment of this invention with reference to FIGS. 1 and 2, numeral 1 is a chassis of a trailer, 2 is a front axle, 6 is a steering-coupling rod to carry out the two functions simultaneously of steering said front axle 2 of a trailer and of coupling the latter to the chassis of the preceding van, 4 is a pin for pivotal rotation of said front axle 2, 3 is a rear axle of a trailer, 5 is a pin for pivotal rotation of said rear axle 3, 6' a steering-coupling rod of the succeeding trailer, and 7 a coupling-pin connected to chassis 1 and coupling chassis 1 to the coupling rod 6' of the succeeding trailer. Also, the numeral 9 is a sprocket fixed to a front axle 2, 10 a sprocket rotatable about the hub 5 of the rear axle 3, 13 an endless chain to transmit the rotary movement of sprocket 9 to sprocket 10, 11 a sprocket rotatable about a coupling pin 7 and fixed to the coupling rod 6' as by a pin 8 or the like, 12 a sprocket rotatable about the hub 5 of the rear axle 3 and fixed to a sun gear 17 of the planetary gearing as seen in FIG. 2, 14 an endless chain to transmit the rotary movement of sprocket 11 to sprocket 12, and 15 an arm fixed to the rear axle 3 and to which are fixed planet gears 18, as by pins 19 forming centers of rotation of planet gears 18. Numeral 16 is an internal ring gear secured to the sprocket 10, and 7″ a coupling-pin of the preceding van corresponding to the coupling-pin 7 of chassis 1. In order to transmit the steering angle of the front axle of the given trailer to the succeeding trailer, the angular position of coupling-rod 6′ thereof against the chassis 1 has now to be examined. Referring to FIG. 5, suppose that the angle which the coupling-rod 6′ of the succeeding trailer makes with the centerline AD of chassis 1 in a front-and-rear direction thereof is indicated by $\gamma$, and the angle which said coupling-rod 6′ makes to the centerline A′B′ of the succeeding van in a front-and-rear direction thereof is indicated by $\alpha'$, and that such factors as the dimensions and the ratios of the teeth of the various gear-wheels or sprockets are identical in the case of the two adjacently coupled trailers and these trailers are being driven along a circular arc of a constant radius of curvature, then the angle $\alpha'$ is one and the same with said angle $\alpha$ which the coupling-rod 6 of the chassis 1 makes against the centerline AD of said chassis 1 in a front-and-rear direction thereof. Also, the steering angle $\beta$ of the rear axle 3 is equal to the steering angle $\alpha$ of the front axle 2. Now, suppose that the midpoint of the line drawn between the hub 4 of the front axle of chassis 1 and the rear axle thereof is indicated by C, the length of said line is $l$, the length of the line drawn between said hub 5 and the coupling-pin 7 is $m$, and the length of line drawn between the hub 4 of said coupling-rod 6 and the coupling-pin 7″ is S, and then the relationship among the above-mentioned dimensions $l$, $m$, and $S$, is given by the equations to be described hereinbelow.

Now, suppose that the dimensions of the trailer are given by the following referential marks:

$$\overline{AB} = l$$
$$\overline{BE} = m$$
$$\overline{EA'} = S$$

Suppose, also, that these coupled vans are passing along a given circular arc of a constant radius of curvature of radius $r$ and center O, and then the relationships among these dimensions $r$, $m$, $l$, and $S$, are given by the following equations:

In the triangles OA′E and OEC:

$$r^2 + S^2 = \overline{OC}^2 + \left(m + \frac{l}{2}\right)^2$$

In the triangle OBC:

$$\overline{OC}^2 + (l/2)^2 = r^2$$

From these equations, the following equations are deduced:

$$r^2 + S^2 = r^2 - \left(\frac{l}{2}\right)^2 + \left(m + \frac{l}{2}\right)^2$$
$$S^2 = m(m + l) \qquad (a)$$

Suppose that the radius of curvature along which these vans are passing is indicated by R and the center thereof by O and the following equations are deduced:

$$\alpha = \alpha' = \beta$$
$$\angle DEA' = \angle COA' = \gamma$$
$$DA' = S \tan \gamma$$

In the triangle AOC:

$$AC = R \sin \alpha = l/2 \qquad (b)$$

In the triangle DOC:

$$OC = OD \cos \gamma = (OA' + A'D) \cos \gamma$$
$$\therefore \cos \alpha = (R + S \tan \gamma) \cos \gamma \qquad (c)$$

From these equations, the following equation illustrating the relationship between the dimensions $\alpha$ and $\gamma$ is deduced:

$$\cos \alpha = \cos \gamma + \frac{2S}{l} \sin \alpha \sin \gamma \qquad (d)$$

As a matter of fact, the radius R, of the circular arc along which the vans are supposed to be passing is extremely large as compared with the length of the segment $l$ between the hub 4 of the front axle and hub 5 of the rear axle of a given trailer, so that $\sin \alpha$ in the above-mentioned Equation $b$ may safely be replaced by $\alpha$ and the abovementioned Equation $d$ may be replaced by the following equation:

$$\gamma = \left(\frac{2S}{l} \pm \sqrt{\frac{4S^2}{l^2} + 1}\right)\alpha \qquad (e)$$

Since $l$ and $S$ in the above equation are constants, $\gamma$ and $\alpha$ are in direct proportion. Also, the circular arc along which these vans are supposed to be passing has a constant radius of curvature, so that $\alpha$ may be substantially equivalent to $\alpha'$ and the above Formula $e$ may be replaced by the following equation:

$$\gamma = k\alpha = k\alpha' \qquad (e')$$

Consequently, the steering angle $\alpha'$ of the front axle 2′ of the succeeding trailer may be given easily by the above Equation $e'$ through calculating the angle $\gamma$ which the coupling rod 6′ of the succeeding trailer makes to the chassis 1.

From the steering angle $\alpha'$ of the front axle 2′ of the succeeding trailer given from the above Equation $e'$ through calculating the angle $\gamma$ and from the steering angle $\alpha$ of the front axle 2 of given trailer, the steering angle $\beta$ of the rear axle of given trailer when driven along a freely curving track may be given by the below equation:

$$\beta = K\alpha + K'\alpha' \qquad (f)$$

wherein K and K′ are constants and the relationship between these constants are given as follows:

$$K + K' = 1$$
$$0 < K < 1, \quad 0 < K' < 1$$

In case K equals unity and K′ equals null, then $\beta$ equals $\alpha$ and the case is equivalent to that illustrated in FIG. 4 wherein the steering angle $\beta$ of the rear axle 3 is made equal to the steering angle $\alpha$ of the front axle 2; in case K equals null and K′ equals unity, then $\beta$ equals $\alpha'$ and the case is identical with the case wherein the steering angle $\beta$ of the rear axle 3 is made equal to the steering angle $\alpha'$ of the front axle 2′ of the succeeding van. In deciding the value of these constants K, K′, one may be substantially equivalent with the other, as a matter of fact, but may also be variable in accordance with the object in view.

In setting this relationship in practice, a planetary gearing, such as is shown in FIG. 2, may be employed. Also, in a device shown in FIG. 1, the numbers of teeth of the gears of the planetary gearing and the sprockets may be calculated. Suppose that the number of teeth of the internal ring gear 16 is given by S and the number of teeth of the sun gear 17 is given by S′ and the angle of rotation of planet gears 18 about the axle 5 may be known from the formula of planetary gearing. In case sun gear 17 is fixed and the internal ring gear 16 is turned at an angle $\theta$, then gears 18 turn at an angle of $$\theta \frac{S}{S + S'}$$

and in case internal ring gear 16 is fixed and the sun gear turns at an angle $\theta'$, then gears 18 turn at an angle $$\theta' \frac{S'}{S + S'}$$

It follows from these that, in case said internal ring gear 16 is turned at an angle $\theta$ and simultaneously the sun gear is turned at an angle $\theta'$, then gears 18 turn at an angle equal to the sum of these angles, that is, turns at an angle of $$\frac{\theta S}{S+S'}+\frac{\theta' S'}{S+S'} \qquad (f')$$

In order that the rotary angle $\beta$ of the rear axle 3 may be equal to the angle given by Formula $f$, the following equation should exist among the variants:

$$K\alpha+K'\alpha'=\frac{\theta S}{S+S'}+\frac{\theta' S'}{S+S'} \qquad (g)$$

Suppose that the ratio of number of teeth of sprocket 9 to that of teeth of sprocket 10 is given by $K_1$, and the ratio of number of teeth of sprocket 11 to that of sprocket 12 is given by $K_1'$, then the proportion of the rotary angle $\theta$ of the inwardly toothed gear-wheel 16 to the rotary angle $\alpha$ of the front axle 2 is shown by the equation.

$$\theta = K_1 \alpha$$

and the proportion of the rotary angle $\theta'$ of sun gear 17 to the rotary angle $\gamma$ of the coupling-rod 6' of the succeeding van is shown by the equation $$\theta' = K_1' \gamma$$

while from the aforementioned Equation $e'$ the following equation is deduced:

$$\alpha' = \frac{\gamma}{k}$$

wherein $\alpha'$ is a steering angle of the front axle 2' of the succeeding trailer.

In order for said Equation $g$ to exist, the first terms of the left and right sides of the Equation $g$ may be made equal and the second terms of the left and right sides of the Equation $g$ may also be made equal. With the abovementioned equations taken in view, the first terms of said Equation $g$ are given by the equation $$K = \frac{K_1 S}{S+S'}$$

and the seocnd terms by the equation $$\frac{K'}{k} = \frac{K_1' S'}{S+S'}$$

Next, these equations are synthesized by taking the ratio thereof and the following equation is given:

$$k\frac{K}{K'} = \frac{K_1 S}{K_1' S'} \qquad (h)$$

wherein $K$, $K'$ and $k$ are constants and $K_1$, $K_1'$, $S$, and $S'$ are variants which may be fixed at will, so that the number of teeth of the sprockets and that of the gear-wheels in the planetary gearing may be given from the above Formula $h$. Although the description of this invention has been restricted to an embodiment utilizing a planet gear-wheel system, it is to be noted that such planetary gearing may as well be replaced by levers or cam-wheels, or by such media as oil pressure, electricity, air or the like, and the present invention utilizing these devices will work almost as effectively.

As described in the above, the present invention not only enables a number of open-road vans to be pulled along the ruts of the tractor in the van, with only the tractor being driven and properly steered by a driver, but also make a rapid turn easily even at a very precipitous curve, much in the same manner as railroad carriages or vans, so that the capacity of traffic on the open road is increased and a large number of package units may be conveyed at a time without any difficulty, while the expenses of transport are remarkably lessened.

What we claim is:

1. A full trailer comprising a body; dirigible front and rear wheeled axles pivotal on said body about respective spaced substantially vertical axes; transmission means interconnecting said axles for coordinated pivotal movement in opposite directions; and steering means operatively associated with said rear axle and with said transmission means and operable, during steering of said trailer, to pivot said rear axle through an angle substantially equal to the sum of the steering angle of said front axle, multiplied by a first ratio, and the steering angle of the front axle of the following trailer, multiplied by a second ratio, where said ratios are greater than zero and less than one, and where the steering angle of the rear axle is equal to the sum of the steering angle of the forward axle and the steering angle of the forward axle of the trailing vehicle.

2. A full trailer comprising a body; dirigible front and rear wheeled axles pivoted on said body about respective substantially vertical axes spaced by a predetermined distance; a first coupling rod fixedly secured to said front axle for movement therewith and for connection to a preceding vehicle, said first coupling rod having a predetermined length; a coupling pin member pivotal on said body about a substantially vertical axis at a predetermined spacing rearwardly from the pivot axis of said rear axle, said coupling member being adapted for connection thereto of the free end of a coupling rod, having said predetermined length, fixedly secured to the front axle of a similar following full trailer; wherein said predetermined spacing multiplied by the sum of said predetermined spacing and said predetermined distance is equal to said predetermined length multiplied by itself; transmission means interconnecting said front and rear axles for coordinated pivotal movement in opposite directions; steering means operatively associated with said rear axle; planetary gearing interconnecting said rear axle and said transmission means; and second transmission means interconnecting said coupling pin member and said first-mentioned transmission means.

3. A full trailer comprising a body; dirigible front and rear wheeled axles pivotal on said body about respective spaced substantially vertical axes; transmission means interconnecting said axles for coordinated pivotal movement in opposite directions; and steering means operatively associated with said rear axle and with said transmission means and operable, during steering of said trailer, to pivot said rear axle through an angle substantially equal to the sum of the steering angle of said front axle, multiplied by a first ratio, and the steering angle of the front axle of the following trailer, multiplied by a second ratio, where said ratios are greater than zero and less than one, and where the steering angle of the rear axle is equal to the sum of the steering angle of the forward axle and the steering angle of the forward axle of the trailing vehicle; said steering means including planetary gearing interconnecting said rear axle and said transmission means.

4. A full trailer comprising a body, dirigible front and rear wheeled axles pivotal on said body about respective spaced substantially vertical axes; transmission means interconnecting said axles for coordinated pivotal movement in opposite directions; and steering means operatively associated with said rear axle and with said transmission means and operable, during steering of said trailer, to pivot said rear axle through an angle substantially equal to the sum of the steering angle of said front axle, multiplied by a first ratio, and the steering angle of the front axle of the following trailer, multiplied by a second ratio, where said ratios are greater than zero and less than one, and where the steering angle of the rear axle is equal to the sum of the steering angle of the forward axle and the steering angle of the forward axle of the trailing vehicle; a coupling pin member pivotal on said body about a substantially vertical axis at a predetermined spacing rearwardly from the pivot axis of said rear axle, said coupling member being adapted for connection to the free end a coupling rod fixedly secured to the front axle of a similar following full trailer; said steering means including planetary gearing interconnecting said rear axle and said transmission means; and second transmission means interconnecting said coupling member and said first-mentioned transmission means.

5. A full trailer, as claimed in claim 4, said planetary gearing having a first member forming part of said first-mentioned transmission means, a second member forming part of said second transmission means, and a third member connected to said rear axle.

References Cited

UNITED STATES PATENTS 1,416,613  5/1922  Colardeau _____ 280—442 X

FOREIGN PATENTS 660,099  3/1963  Canada.
488,355  12/1929  Germany.

KENNETH H. BETTS, *Primary Examiner.*